United States Patent [19]
Girvan et al.

[11] Patent Number: 6,022,480
[45] Date of Patent: *Feb. 8, 2000

[54] METHODS AND DEVICES FOR TREATING WATER

[75] Inventors: Don H. Girvan, St. Augustine; Philip R. Reynolds, Jacksonville, both of Fla.

[73] Assignee: The John Girvan Company, Inc., Jacksonville, Fla.

[*] Notice: This patent is subject to a terminal disclaimer.

[21] Appl. No.: 08/923,101

[22] Filed: Sep. 4, 1997

Related U.S. Application Data

[63] Continuation-in-part of application No. 08/608,242, Feb. 28, 1996, Pat. No. 5,676,844.

[51] Int. Cl.⁷ ............................ C02F 1/50; A01N 25/00
[52] U.S. Cl. .................... 210/756; 210/764; 210/169; 210/233; 422/277; 424/408; 424/659; 424/660
[58] Field of Search .................... 210/169, 233, 210/756, 764; 422/265, 261, 276, 277; 137/268; 423/276; 424/408, 657, 659, 660

[56] References Cited

U.S. PATENT DOCUMENTS

| | | | |
|---|---|---|---|
| 2,934,409 | 4/1960 | Biehl | 422/265 |
| 3,792,979 | 2/1974 | Clinton | 422/265 |
| 3,793,216 | 2/1974 | Dychdala et al. | 252/187 H |
| 4,048,351 | 9/1977 | Saeman et al. | 427/213 |
| 4,146,676 | 3/1979 | Saeman et al. | 428/403 |
| 4,435,857 | 3/1984 | Meloy | 4/227.6 |
| 4,594,091 | 6/1986 | Girvan | 71/67 |
| 4,692,314 | 9/1987 | Etani | 422/265 |
| 4,747,978 | 5/1988 | Loehr et al. | 252/175 |
| 4,781,897 | 11/1988 | Geron et al. | 422/265 |
| 4,853,131 | 8/1989 | Etani | 210/696 |
| 5,124,032 | 6/1992 | Newhard | 210/169 |
| 5,131,938 | 7/1992 | Girvan | 71/67 |
| 5,164,109 | 11/1992 | Wojtowicz | 252/175 |
| 5,478,482 | 12/1995 | Jones et al. | 210/753 |
| 5,514,287 | 5/1996 | Jones et al. | 210/753 |
| 5,676,844 | 10/1997 | Girvan | 210/756 |

*Primary Examiner*—David A. Simmons
*Assistant Examiner*—Fred Prince
*Attorney, Agent, or Firm*—Jones & Askew, LLP

[57] ABSTRACT

The present invention comprises devices and methods for treating a standing water system comprising devices for the administration to the standing water system an admixture comprising calcium hypochlorite and borate salts and acids through a perforated distribution device. The method of treating a standing water system more efficiently provides free chlorine to the system, stabilizes the pH of the standing water system, and reduces the undesired side effects of the addition of calcium hypochlorite alone.

12 Claims, No Drawings

METHODS AND DEVICES FOR TREATING WATER

CROSS REFERENCE TO RELATED APPLICATIONS

This application is a continuation-in-part of U.S. patent application Ser. No. 08/608,242 filed Feb. 28, 1996, now issued as U.S. Pat. No. 5,676,844, which is hereby incorporated by reference in its entirety.

TECHNICAL FIELD

This invention relates to devices and methods for treating water comprising a dispensing device containing a composition of tetraborate or tetraborate/boric acid and calcium hypochlorite $Ca(OCl)_2$. The method can be used for treating standing water such as water in swimming pools, spas, cooling towers and the like. The composition further comprises the alkaline metal tetraborate and optionally, boric acid, mixed with calcium hypochlorite.

BACKGROUND OF THE INVENTION

In standing water, swimming pools, hot tubs and spas, it is necessary to filter and recirculate water, add chemicals to keep the water safe for bathing or free from algal growth, and remove impurities. It is particularly important to keep standing waters clean for safe use and free from growth of unwanted biological organisms.

As a part of basic pool and water maintenance, it is frequently the case that the water is treated with halogen chemicals, particularly chlorine and bromine. Some bodies of water may be treated with chlorine gas which is dangerous and difficult to use. There is always the danger of exposure of humans or animals to the chlorine gas.

For smaller bodies of water, chlorine is typically purchased and used in the form of calcium hypochlorite granules which may be mixed with water to form a liquid and then poured into the swimming pool. Although such techniques of chlorine dispersion and chemical treatment of water are widespread, there are many disadvantages associated with these methods. In particular, the chlorine is positioned and dispensed near the top of the pool thereby making the treatment inefficient as chlorine evaporates from the surface of the water at a high rate. Furthermore, the process of mixing chlorine granules generally requires the use of buckets and there is a substantial risk of splashing highly chlorinated water, which can cause damage to clothing, discoloration of surrounding areas such as ceramic tile or vinyl, and physical irritation to lungs, eyes and skin due to the caustic fumes.

Another problem associated with the distribution of chemicals in swimming pools, hot tubs, spas and standing water systems, is the actual handling of the chemicals themselves. Most water treatment chemicals are present in granular or powder form, and must be scooped, dissolved, and subsequently distributed. Chemicals which are available in solid or block forms must also be handled, and placed into appropriate devices for distribution. It is generally not feasible to provide pool chemicals or water treatment chemicals, especially chlorine, in liquid form for simplified distribution as this may decrease shelf life or storage options. Consequently, most individuals handling pool or water chemicals must wear suitably protective clothing such as gloves and protective eyewear. Such precautions make chemical treatment of water both tedious and cumbersome. Additionally, many water treatment chemicals are flammable and must be stored to prevent accidental combustion.

Sodium tetraborate has long been known to be effective as an algaecide and a fungicide in standing water systems such as swimming pools, drinking water reservoirs, and cooling towers and is the subject of U.S. Pat. Nos. 4,594,091 and 5,131,938, both to Girvan, both of which are incorporated herein by reference in their entirety. It has been found that the alkaline metal, tetraborate, by itself improves the treatment of standing water systems in several ways. The tetraborate solutions plus dissolved carbon dioxide produce sodium carbonate plus sodium bicarbonate, thereby lowering the $CO_2$ concentration in the water and making it difficult for algae to germinate in the water. The tetraborates have also been shown to react with dissolved halides in the water to give off free halogen. Finally, the tetraborates increase the solubility of most other salts that may be added to the standing water system.

Another additive that is commonly used to treat standing water is calcium hypochlorite. Calcium hypochlorite is added to water and, when dissolved in water, provides a source of chlorine for disinfectant purposes and for general sanitation. Several commercial processes are currently used for the manufacture of the so-called "high-grade" calcium hypochlorite compositions containing at least 65% calcium hypochlorite from which the chlorine for sanitation purposes is derived. Several of these processes are described in U.S. Patent No. 3,793,216 which is incorporated herein by reference in its entirety.

The '216 patent discloses a calcium hypochlorite composition comprising at least 55% calcium hypochlorite mixed with water soluble, hydrated inorganic salts in an amount sufficient to provide a water content in the total mixture in the range of about 3% to about 13%. Included in the disclosure, as one of the hydrated inorganic salts, are the salts containing tetraborate. The focus of the '216 patent is to reduce the flammability of the calcium hypochlorite.

The major disadvantage of the essentially water-free calcium hypochlorite compositions is the danger intended thereto if contacted by external contaminants, which contamination causes exothermic decomposition of the material regardless of the temperature. For example, if any portion of a batch of said calcium hypochlorite, whether in a small container, large drum or uncontained mass, reaches a temperature of about 350° F., it will undergo a self-sustaining and self-propagating decomposition which will spread through the entire batch until decomposition is complete. Decomposition may be initiated by the accidental touching of a live flame or spark to the calcium hypochlorite composition, as for example, the accidental contact of a lit match or cigarette. Decomposition may also be initiated by contacting the hypochlorite with just a single drop of organic material, for example, glycerin, and alcohol, a variety of hydrocarbons such as petroleum oil and many others. The decomposition of all gaseous chlorine which constitutes a toxic hazard to personnel in the area, and also involves oxygen, which intensifies a fire that might reach stored quantities of calcium hypochlorite. Because oxygen is released in the decomposition process, attempts to smother a hypochlorite fire will be unsuccessful. The '216 patent thus describes a composition which reduces the likelihood of spontaneous decomposition of the calcium hypochlorite composition. However, the '216 patent does not disclose any other properties of a composition comprising calcium hypochlorite and an alkaline metal tetraborate and/or boric acid.

What is needed in the industry is a method of distributing a composition that will stabilize pH of the water, reduce the presence of algae and other microorganisms which normally grow in standing water, and provide a source of halogens which will further sanitize the water solution. More particularly, what is needed is an efficient and safe method of distributing water-treatment chemicals whereby the chemicals are optimally utilized and whereby unnecessary exposure of the chemicals to the persons tending the body of water and the environment is minimized.

SUMMARY OF THE INVENTION

The present invention provides devices and methods for the controlled administration of water treatment chemicals and provides for the safe handling of chemicals. Chemicals such as calcium hypochlorite/tetraborate are packaged and shipped in sealed conveniently-sized containers. Particularly, the composition of U.S. patent application Ser. No. 08/608,242, herein incorporated in its entirety, is suitable for use with the present method. For use, one or more perforations are made into the container so that when the container is immersed in water, the motion of the water and interaction with the water, causes the chemical to dissolve and distribute into the water. The number of perforations made into the container, together with the motion of water, are coordinated such that the desired rate of chemical distribution is achieved.

Surprisingly, when the compositions of U.S. patent application Ser. No. 08/608,242, an admixture comprising an effective amount of calcium hypochlorite and an effective amount of a mixture comprising borate salt and boric acid, is used with the current invention, an unexpected advantage is found in that the composition forms a solid briquette. The solid briquette does not immediately dissolve and flow into the water percolating through the openings in the container. With many other kinds of water treatment chemicals, the chemicals immediately dissolve into the water and thus too much chemical is provided immediately and all of the chemical is gone in a short amount of time. Instead, the briquette formed by the composition of U.S. patent application Ser. No. 08/608,242, in combination with the perforations in the container, allows for the even distribution of the composition into the body of water.

A composition used with the present method is a calcium hypochlorite/alkaline metal tetraborate composition or a calcium hypochlorite/alkaline metal tetraborate/boric acid composition to treat standing water systems such as swimming pools, spas, cooling towers and the like. The method of treating water of the present invention comprises the addition of the calcium hypochlorite/tetraborate and/or boric acid composition to the water periodically to stabilize pH and to increase the available chlorine to the water. It has been found that the calcium hypochlorite/tetraborate and/or boric acid composition act synergistically to reduce the growth of microorganisms in the water, reduce the cloudy scale on the sides of the water container that normally occurs when only calcium hypochlorite is added to the water and reduces the calcification of filters, especially sand filters.

The device of the present invention may be any convenient storage or shipping container into which preselected openings can be made. Such a device includes, but is not limited to, plastic or polymer bags which are waterproof. The device may have a convenient appendage for anchoring the container within the body of water.

A method of the present invention involves the creation of selected openings in a sealed container that contains calcium hypochlorite/alkaline metal tetraborate compositions or a calcium hypochlorite/alkaline metal tetraborate/boric acid compositions. The container with the selected openings is placed in a body of water, for example, a swimming pool. For a swimming pool, a convenient site for placement is the skimmer. Upon placement in the water, the composition within the container forms a solid briquette. The selected openings allow the water to flow through the container, across the briquette, and the composition is evenly distributed into the swimming pool. Treating water before the filter thereby allowing the chlorine residual to last longer with longer filter cycles.

Accordingly, it is an object of the present invention to provide a method for treating standing water systems such as swimming pools, spas, and cooling towers by administering a composition comprising calcium hypochlorite and an alkaline metal tetraborate or calcium hypochlorite and a combination of an alkaline metal hypochlorite and boric acid.

It is another object of the present invention to provide a device for treating standing water systems such as swimming pools, spas, and cooling towers by administering a composition comprising calcium hypochlorite and an alkaline metal tetraborate or calcium hypochlorite and a combination of an alkaline metal hypochlorite and boric acid.

It is an object of the present invention to provide a method for treating standing water systems wherein a chemical is distributed by being placed within a perforated device.

It is a further object of the present invention to provide a device for distributing a chemical in a body of water.

It is another object of the present invention to provide a method for treating standing water systems wherein the device for chemical distribution comprises necessary perforations for a desired rate of chemical distribution.

It is yet another object of the present invention to provide a device and method for treating standing water systems wherein the device is placed or anchored within a skimmer through which water circulates.

It is an object of the present invention to provide a method for chemically treating standing water wherein the chemicals may be efficiently utilized and safely handled.

It is a further object of the present invention to provide a device comprising chemicals for treating a standing body of water that can be safely handled and provides less exposure to the chemicals within.

It is yet another object of the present invention to provide a device and method for treating standing water systems wherein the device contains a calcium hypochloride composition.

It is further an object of the present invention to provide a device and method for treating standing water systems which will increase the availability of free chlorine to the system.

It is yet another object of the present invention to provide a device and method for treating standing water systems with a composition wherein the cloudiness of the water is reduced.

It is yet another object of the present invention to provide a device and method for treating standing water systems with a calcium hypochlorite solution wherein the scale on the sides of the water container are reduced.

It is another object of the present invention to provide a device and method for treating standing water wherein the normal cost of a calcium hypochlorite treatment of the standing water system is reduced.

Another object of the invention is to provide a means by which the advantages of water treatment chemicals can be made available in relatively small water systems.

One other object of the invention is to provide safe containers for the storage and shipment of dangerous water treatment chemicals and to provide child-proof containers for final consumer use.

Another object of this invention is to provide a device and method for using water treatment chemicals that is both simple and safe.

These and other objects, features and advantages of the present invention will become apparent after a review of the following detailed description of the disclosed embodiments.

DETAILED DESCRIPTION

The present invention comprises devices and methods for treating standing water systems with a composition comprising calcium hypochlorite and an alkaline metal borate placed within a distribution. Specifically, water treatment chemicals a re contained within a perforated device or container such as a plastic bag. The container is the suspended, placed, or immersed into the water dispensing equipment such as a pool skimmer. Circulation of the water through dispenser or skimmer causes the chemical to dissolve and disperse at a predetermined rate. The rate of dispersion is controlled by varying the number of perforations in the container. If necessary, the container may be attached to the filter or skimmer by use of an anchoring device.

A preferred embodiment is a method and device which are designed to dispense halogen sanitizer, such as Proteam® Calcibor, into a pool or spa on the suction side of the system. The sanitizer within the bag is turned into a briquette when the bag, with predetermined openings being made into the bag, is placed into the water. This is a surprising finding because if calcium hypochloride alone, in a bag with openings, is placed into water, the calcium hypochloride quickly dissolves and provides too much chemical too quickly with no chemical provided at a later time.

The devices and methods of the present invention are designed to dispense halides, blended with an erosion inhibitors, in a briquette that forms immediately upon introduction to water. The composition prior to introduction into water is a blended powder-like composition. The container can provide distribution of the chemicals without need for liners or reinforcement. A single-walled plastic-type bag may have the sites for openings printed on it.

The chemical distribution devices of the present invention comprise containers capable of containing water treatment chemicals, including, but not limited to, an admixture comprising an effective amount of calcium hypochlorite and an effective amount of a mixture comprising borate salt and boric acid. The container is constructed of materials resistant to both destruction from prolonged exposure to water and sunlight and to corrosive and harsh substances such as chlorine. Such devices may be constructed from plastic, nylon, rubber and the like. The devices may be available in various shapes such as bags, hollow balls or capsules, cylindrical tubes and boxes. Preferably, the shape and size of the apparatus is determined by the equipment in which it is to be placed. For example, in a water filter having very little free area, the device may be a small, flexible plastic bag which is able to fit into a confined space. For larger spaces such as in pool skimmer baskets, the shape and size of the device would not be so restricted.

The devices of the present invention have openings for the exposure of the water treatment chemicals to the water environment. Prior to placement in the water, the devices do not have openings or any such openings are sealed or shut in any manner known to those in the art. One embodiment would have the sites for the openings indicated by printed circles on the container. Preferably, the devices have from 1 to 12 openings, which are predetermined, in the device, more preferably, there are from 1 to 8 openings, and most preferably, there are 2 to 8 openings in the device. A preferred device has the openings indicated on the unopened device such that a consumer could readily select the necessary number of openings, and open the openings for optimum distribution of the composition to the body of water.

The device may optionally be anchored or attached to a particular area. For example, in a skimmer basket, it may be attached to the basket by use of string or other appropriate anchoring device such as hooks, clips, plastic coated wires, velcro and the like.

A preferred embodiment of the invention comprises a device such as a sealed, flexible, plastic pouch having enclosed within it water treatment chemicals such as an admixture comprising an effective amount of calcium hypochlorite and an effective amount of a mixture comprising borate salt and boric acid. The device has a number of sites for creating openings printed on the pouch. A preferred method of the present invention comprises determination of the total amount of water to be treated, creating perforations in the pouch at the predetermined, designated sites, and placing the device containing the composition into a swimming pool skimmer basket. Upon contact with water, the composition forms a briquette, which gradually dissolves over a period of time, dispensing a predetermined amount of chemical into the swimming pool at a desired rate. Generally, as water is drawn past the briquette, the motion of the water allows for uniform erosion of chemicals from the briquette. The erosion is controlled by the rate of dissolution of the briquette, the rate of flow past the briquette, exposure of the briquette and the length of time the flow continues. Once the briquette is substantially dissolved, the container simply floats to the surface of the skimmer, indicating to the pool operator that a replacement is necessary.

The devices and methods of the present invention are especially desirable because users do not have to handle the chemical itself. Many water treatment chemicals are highly corrosive, poisonous and dangerous, thus, eliminating the possibility of the direct contact with such chemicals is particularly advantageous. In addition, the invention is environmentally safe in that it does not expose chlorine gas to the atmosphere as unsealed containers of chlorine presently do. Also, the invention comprises pre-measured amounts of chemicals, thereby eliminating the added step of measuring out individualized quantities for each periodic distribution with its inherent risk of contact with the handler and the environment.

The devices and methods of the present invention are further desirable because pre-packaged pouches containing chemicals may be easily shipped, stored and distributed. In addition, the devices are cost-effective and easy to use since no complicated pumps, or motorized components are involved.

The borate in the composition is preferably an alkaline metal tetraborate pentahydrate, an alkaline metal tetraborate dehydrate, or an alkaline metal tetraborate pentahydrate. The alkaline metal can be any alkaline metal that is compatible with the borate ion. These alkaline metals include sodium, potassium, and lithium. The composition that can be used in the method of the present invention also includes a calcium hypochlorite and a borate with boric acid. The combination of alkaline metal, borate and the boric acid can be in the ratio of 5% to 95% borate to boric acid by weight. In the composition for use in the method of the present invention, the composition comprises between approximately 60% and 80% calcium hypochlorite and between approximately 20% and 40% of the borate molecule. Again, it is contemplated that by the term borate molecule, as used herein, the borate molecule can be any of the borate ions or it can be a combination of the borate ion and boric acid.

To prepare the calcium hypochlorite/borate composition, the compositions are prepared by mixing the particular ingredients uniformly in a powder blender that is, measured amounts of the calcium hypochlorite with varying, measured amounts of the borate salt and/or the boric acid combination. It is important to note that the composition should be uniformly mixed so that the resulting composition is a powder. The composition can be further processed by compressing it into convenient tabs that can be added to the standing water system. Methods of producing these tabs are well known to those of ordinary skill in the art. The calcium hypochlorite that is preferably used in the present invention is commercially available and contains on the order of at least about 65%, normally about 70–78%, and in some cases up to 85% or more by weight of calcium hypochlorite, the remaining constituents being sodium chloride, calcium chlorate, calcium hydroxide, calcium carbonate and calcium chloride. However, the products are always referred to in the trade as "calcium hypochlorite."

The term "standing water system" includes, but is not limited to, swimming pools, spas, hot water tubs, cooling tower systems, foot baths, drinking water reservoirs and the like. The present invention is contemplated as being used in any standing water system wherein pH is desirably maintained at a stable value, the growth of microorganisms is desirably inhibited, and the clarity of the standing water system is desirably maintained.

In performing the method of treating water according to the present invention, the calcium hypochlorite/borate composition is administered to the water, that is the standing water system at a final concentration of between approximately 0.5 to 10 pounds per approximately 10,000 gallons of water. Preferably, the final concentration of calcium hypochlorite/borate composition is between approximately 1 and 3 pounds per 10,000 gallons of water. Most preferably, the concentration of calcium hypochlorite/borate composition is approximately 2 pounds per approximately 10,000 gallons of water. For swimming pool treatment, the water is treated preferably between 1 and 7 times per week. The method of treating standing water of the present invention has several advantages over the use of calcium hypochlorite by itself. As disclosed in the U.S. Pat. No. 3,793,216, the composition of calcium hypochlorite with borate is much less reactive when in contact with organic material and is therefore much safer to use. However, it is not taught or disclosed in the '216 patent that the composition comprising calcium hypochlorite and borates allows one to use approximately 30% less calcium hypochlorite to obtain the same beneficial effects as calcium hypochlorite alone, that the problems of water cloudiness using calcium hypochlorite alone are reduced or eliminated; that the normal problem of scale build-up on the sides of the standing water container are reduced or eliminated; that the calcification of water filters for the standing water system is reduced or eliminated; and that the availability of free chlorine to the standing water system is increased; and that the pH of the standing water system is stabilized at more neutral pH then when calcium hypochlorite is added to the water alone.

This invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLE I

A 12 ounce bag containing a composition of U.S. patent application Ser. No. 08/608,242, an admixture comprising an effective amount of calcium hypochlorite and an effective amount of a mixture of a borate salt and boric acid, was added to a 10,000 gallon pool. In order to deliver 1 ppm, 3 openings were made in the bag.

When the bag was placed in the skimmer of the pool, the composition immediately formed a hard briquette. Unlike other pool treatment chemicals which quickly dissolve into the pool water, the briquette is very stable and is maintained within the bag.

The water in the pool was tested daily for the following parameters:

Free and available chloride, pH, TA, CAH, CYA, TDS and nitrates.

All tests results were in line with desired pool conditions.

After two weeks, the briquette had dissolved and the bag was empty and floating. The bag was removed and another bag, with the composition, was placed in the skimmer.

It should be understood, of course, that the foregoing relates only to preferred embodiments of the present invention and that numerous modifications or alterations may be made therein without departing from the spirit and the scope of the invention.

What is claimed is:

1. A method of reducing microbial growth and maintaining a stable pH in a standing water system comprising the administration of an admixture comprising an effective amount of calcium hypochlorite and an effective amount of a mixture of a borate salt and boric acid in a flexible bag having openings, and placing the flexible bag in water wherein the admixture forms a briquette upon contacting water.

2. The method of claim 1, wherein the concentration of the admixture in the standing water system is between approximately 0.5 and 5 pounds per 10,000 gallons of water.

3. The method of claim 1, wherein the borate salt comprises, sodium tetraborate pentahydrate, sodium tetraborate octahydrate, sodium tetraborate decahydrate, lithium tetraborate pentahydrate, sodium pentaborate, or potassium tetraborate octahydrate.

4. The method of claim 1, wherein the borate salt is sodium tetraborate octahydrate.

5. The method of claim 1, wherein the calcium hypochlorite in the admixture is between approximately 50% and 80% by weight.

6. A method of treating standing water, comprising 1) determining a number of perforations to be made in a flexible bag capable of having openings so that an effective amount of an admixture can be released from the bag, wherein the admixture comprises an effective amount of calcium hypochlorite and an effective amount of a mixture of a borate salt and boric acid, and wherein the admixture forms a briquette upon contacting the water;

2) making the openings; and 3) applying the flexible bag with openings to a standing body of water.

7. A device for-treating a standing body of water, comprising a flexible, waterproof bag capable of having openings, wherein the bag contains an admixture comprising an effective amount of calcium hypochlorite and an effective amount of a mixture of a borate salt and boric acid, and wherein the admixture forms a briquette upon contacting water.

8. The device of claim 7, wherein the borate salt comprises, sodium tetraborate pentahydrate, sodium tetraborate octahydrate, sodium tetraborate decahydrate, lithium tetraborate pentahydrate, sodium pentaborate, or potassium tetraborate octahydrate.

9. The device of claim 7, wherein the borate salt is sodium tetraborate octahydrate.

10. The device of claim 7, wherein the calcium hypochlorite in the admixture is between approximately 50% and 80% by weight.

11. The device of claim 7, wherein the device is a waterproof plastic sealed bag with sites for openings printed on the bag.

12. The device of claim 11, wherein 5 sites are printed on the bag.

* * * * *